US012666124B2

(12) United States Patent
Ren et al.

(10) Patent No.: US 12,666,124 B2
(45) Date of Patent: Jun. 23, 2026

(54) OPTICAL IMAGE STABILIZATION MODULE

(71) Applicant: AAC Microtech (Changzhou) Co., Ltd., Changzhou City (CN)

(72) Inventors: Zhang Ren, Changzhou (CN); Wei Song, Changzhou (CN); Yun Tang, Changzhou (CN)

(73) Assignee: AAG Microtech (Changzhou) Co., Ltd., Changzhou City (CN)

( * ) Notice: Subject to any disclaimer, the term of this patent is extended or adjusted under 35 U.S.C. 154(b) by 48 days.

(21) Appl. No.: 19/001,525

(22) Filed: Dec. 25, 2024

(65) Prior Publication Data

US 2025/0373915 A1      Dec. 4, 2025

Related U.S. Application Data

(63) Continuation of application No. PCT/CN2024/096537, filed on May 31, 2024.

(51) Int. Cl.
| *H04N 23/52* | (2023.01) |
| *H04N 23/54* | (2023.01) |
| *H04N 23/68* | (2023.01) |

(52) U.S. Cl.
CPC ............. *H04N 23/52* (2023.01); *H04N 23/54* (2023.01); *H04N 23/687* (2023.01)

(58) Field of Classification Search
None
See application file for complete search history.

(56) References Cited

U.S. PATENT DOCUMENTS

2023/0188851 A1*  6/2023  Lee ................... H02K 41/0356
348/208.11

* cited by examiner

*Primary Examiner* — Mark T Monk
(74) *Attorney, Agent, or Firm* — Wiersch Law Group

(57) ABSTRACT

An optical image stabilization module includes a fixation holder, a movable holder, an elastic support connecting the two holders and supporting the movable holder to move relative to the fixation holder, an image sensor fixed to the movable holder and moving with the movable holder, a driving unit driving the movable holder to move in a plane in which the image sensor is located, and a damping unit connected between the two holders. The damping unit includes a first clamping plate fixed to the fixation holder, a second clamping plate fixed to the movable holder, and a damping member sandwiched between the two clamping plates. A hardness of the first clamping plate and a hardness of the second clamping plate are both greater than a hardness of the damping member. The optical image stabilization module can improve the optical image stabilization performance.

8 Claims, 4 Drawing Sheets

<u>100</u>

OPTICAL IMAGE STABILIZATION MODULE

FIELD OF THE PRESENT DISCLOSURE

The present disclosure relates to optical imaging devices, in particular to an optical image stabilization module.

DESCRIPTION OF THE RELATED ART

In order to achieve a clear image, an optical imaging device usually has an optical image stabilization module for eliminating shake effects on imaging.

An optical image stabilization module in the related art includes a fixation holder, a movable holder being able to move relative to the fixation holder, and an image sensor fixed to the movable holder and moving with the movable holder, so as to realize optical image stabilization through moving the image sensor. In order to achieve a better optical image stabilization performance, the optical image stabilization module further includes damping glue arranged between the fixation holder and the movable holder for adjusting optical image stabilization movement damping, thus the image sensor can move for optical image stabilization quickly and stably.

However, due to glue fluidity, the damping glue has poor consistency after formed. As a result, the damping glue cannot achieve a desired damping effect, thus causing a poor optical image stabilization performance.

Thus, it is necessary to provide a novel optical image stabilization module to solve the problems.

SUMMARY

An objective of the present disclosure is to overcome the above problems and provide an optical image stabilization module which improves the optical image stabilization performance.

In order to achieve the objective mentioned above, the present disclosure discloses an optical image stabilization module including a fixation holder, a movable holder, an elastic support connecting the fixation holder and the movable holder and supporting the movable holder to move relative to the fixation holder, an image sensor fixed to the movable holder and moving with the movable holder, a driving unit driving the movable holder to move in a plane in which the image sensor is located, and a damping unit connected between the fixation holder and the movable holder. The damping unit includes a first clamping plate fixed to the fixation holder, a second clamping plate fixed to the movable holder, and a damping member sandwiched between the first clamping plate and the second clamping plate. A hardness of the first clamping plate and a hardness of the second clamping plate are both greater than a hardness of the damping member.

As an improvement, the damping member is made of one of silicon, rubber and thermoplastic elastomer.

As an improvement, the first clamping plate and the second clamping plate are both made of stainless steel.

As an improvement, the damping unit has a cylinder shape.

As an improvement, a thickness of the first clamping plate and a thickness of the second clamping plate are both less than a thickness of the damping member.

As an improvement, the fixation holder includes a bottom cover and a shell engaged with the bottom cover. The bottom cover and the shell together form a containment space. The movable holder and the image sensor are arranged in the containment space. The shell includes a top wall opposite to the bottom cover and a side wall connecting the top wall and the bottom cover. The top wall has a through hole exposing the image sensor. The movable holder includes a bottom plate opposite to the bottom cover and two supporting members respectively arranged on two opposite sides of the bottom plate. The image sensor is fixed to the bottom plate. The elastic support includes a first connecting part fixed to the bottom plate and surrounding the image sensor, two second connecting parts extending from the first connecting part and fixed to the two supporting members in one-to-one correspondence, two third connecting parts fixed to the bottom cover and respectively arranged on another two opposite sides of the bottom plate, and four elastic arms respectively connected between every adjacent second connecting part and third connecting part, each elastic arm extending along the side wall.

As an improvement, an amount of the damping units is two, and the two damping units are in one-to-one correspondence to the two supporting members. Each damping unit is arranged between the corresponding supporting member and the top wall. The first clamping plate of each damping unit is arranged in a corresponding containment hole formed in the top wall. The second clamping plate of each damping unit is arranged in a containment groove formed in the corresponding supporting member.

As an improvement, the optical image stabilization module further includes a sensor circuit board. The sensor circuit board is fixed to the bottom plate and surrounds the image sensor. The driving unit includes four electromagnetic assemblies respectively arranged at four corners of the side wall. Each electromagnetic assembly includes a first magnet fixed to the top wall, a second magnet fixed to the bottom cover and facing the first magnet, and a coil assembly arranged between the first magnet and the second magnet. The first magnet includes a first portion and a second portion that are perpendicular to each other. The second magnet includes a third portion and a fourth portion that are perpendicular to each other. The first portion of the first magnet faces the third portion of the second magnet. The second portion of the first magnet faces the fourth portion of the second magnet. The coil assembly includes a coil circuit board fixed to the sensor circuit board and a first coil and a second coil that are formed on the coil circuit board and perpendicular to each other. The first coil is arranged between the first portion of the first magnet and the third portion of the second magnet. The second coil is arranged between the second portion of the first magnet and the fourth portion of the second magnet.

In the optical image stabilization module according to the present disclosure, the damping unit connected between the fixation holder and the movable holder includes the first clamping plate fixed to the fixation holder, the second clamping plate fixed to the movable holder, and the damping member sandwiched between the first clamping plate and the second clamping plate. The hardness of the first clamping plate and the hardness of the second clamping plate are both greater than the hardness of the damping member. Thus, the damping unit has a stable and reliable design structure, thereby having good consistency and a better damping effect. Therefore, the optical image stabilization module can improve the optical image stabilization performance.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
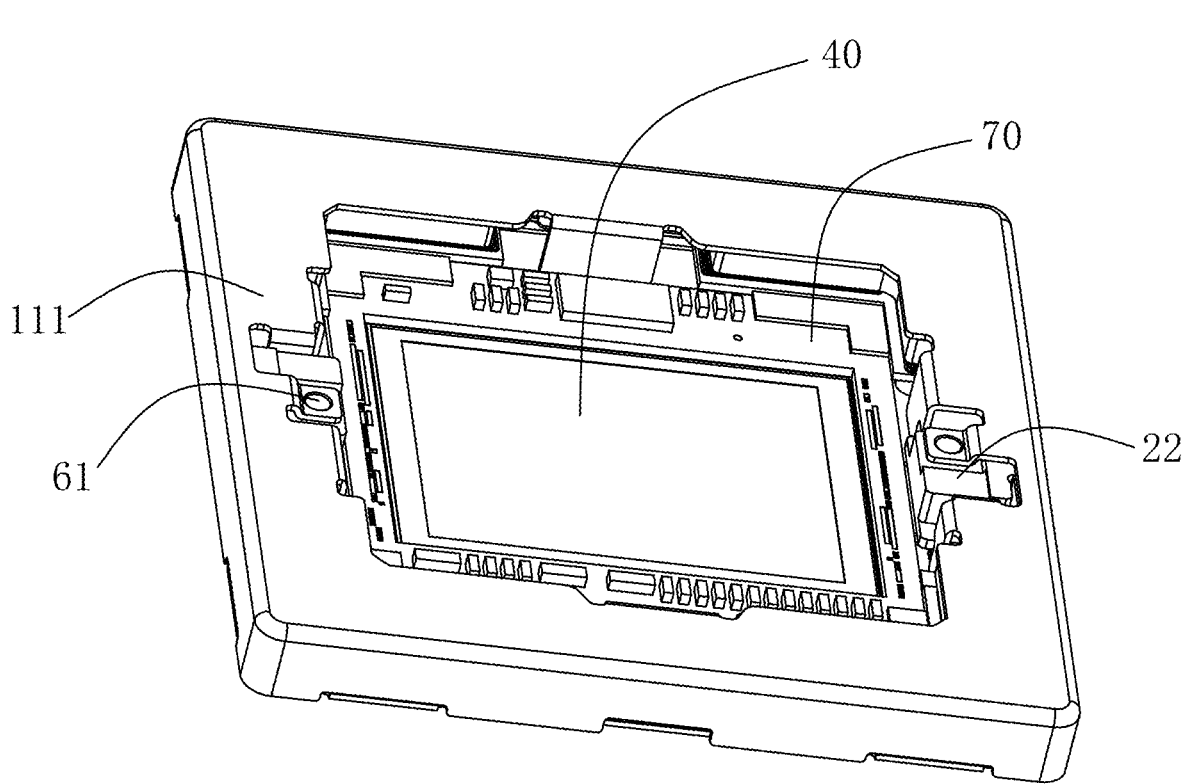
FIG. 1 is an isometric view of an optical image stabilization module of the present disclosure.
Figure 2:
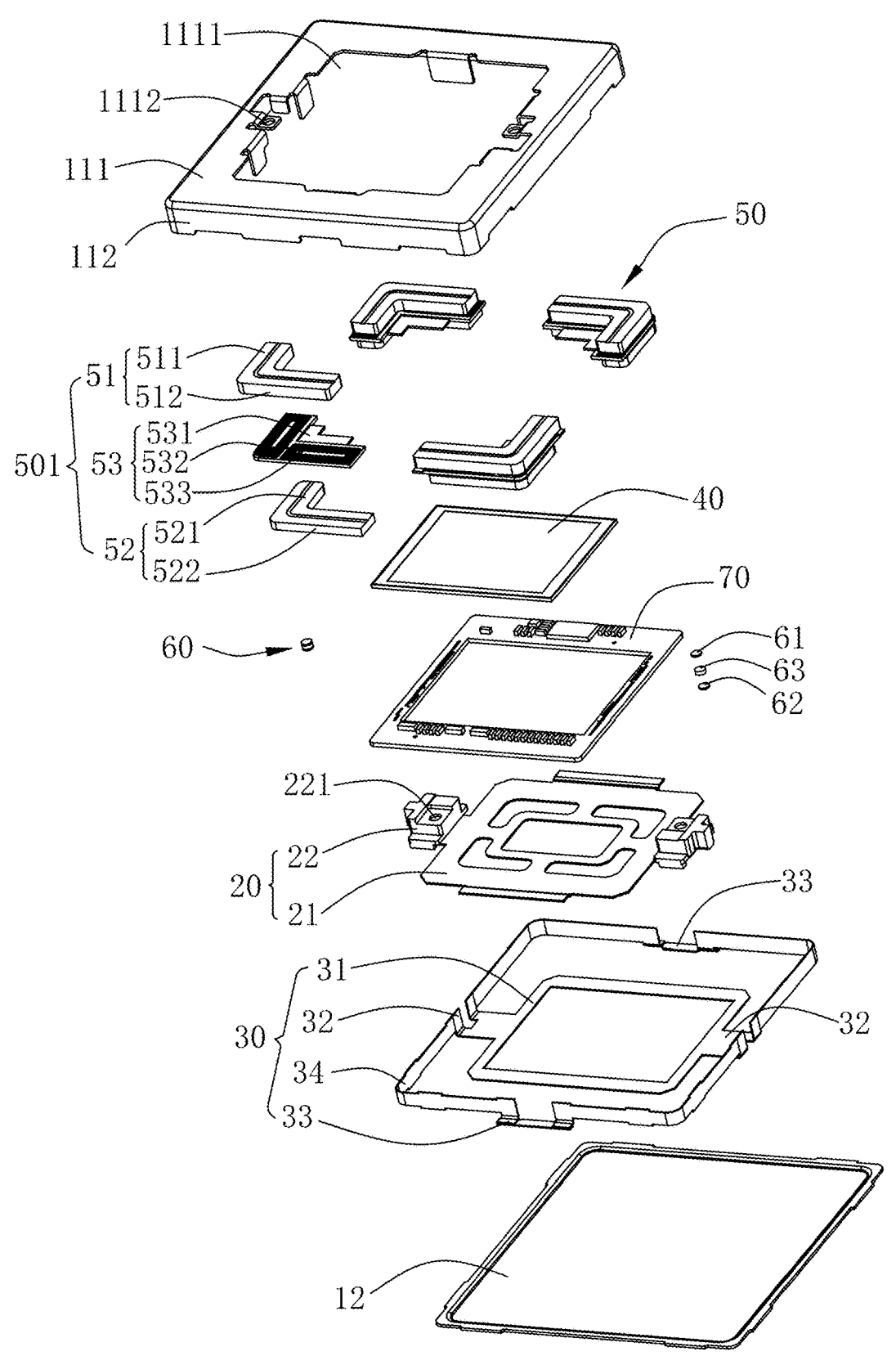
FIG. 2 is an exploded view of the optical image stabilization module in FIG. 1.
Figure 3:
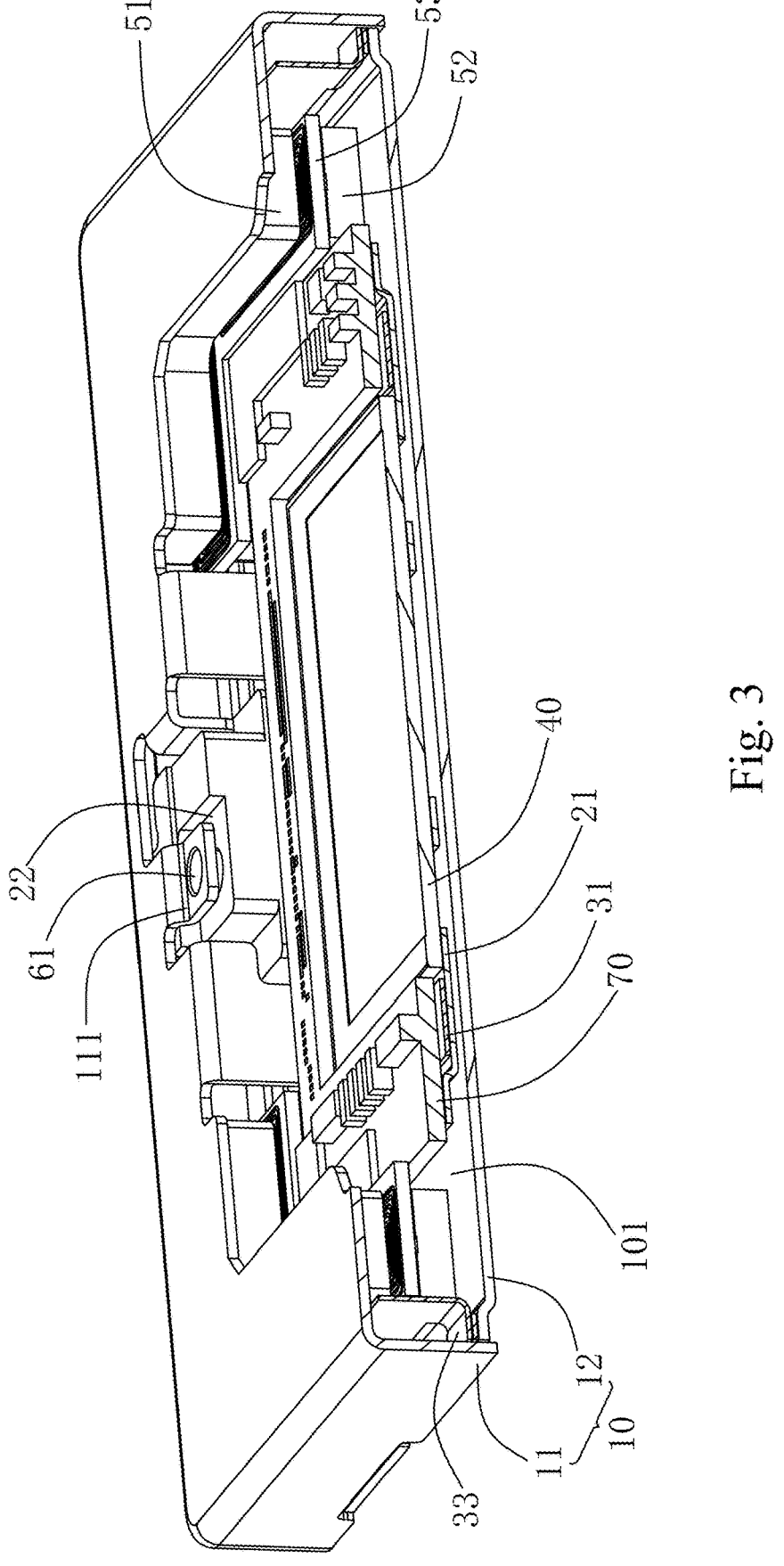
FIG. 3 is a cross-sectional view of the optical image stabilization module in FIG. 1.
Figure 4:
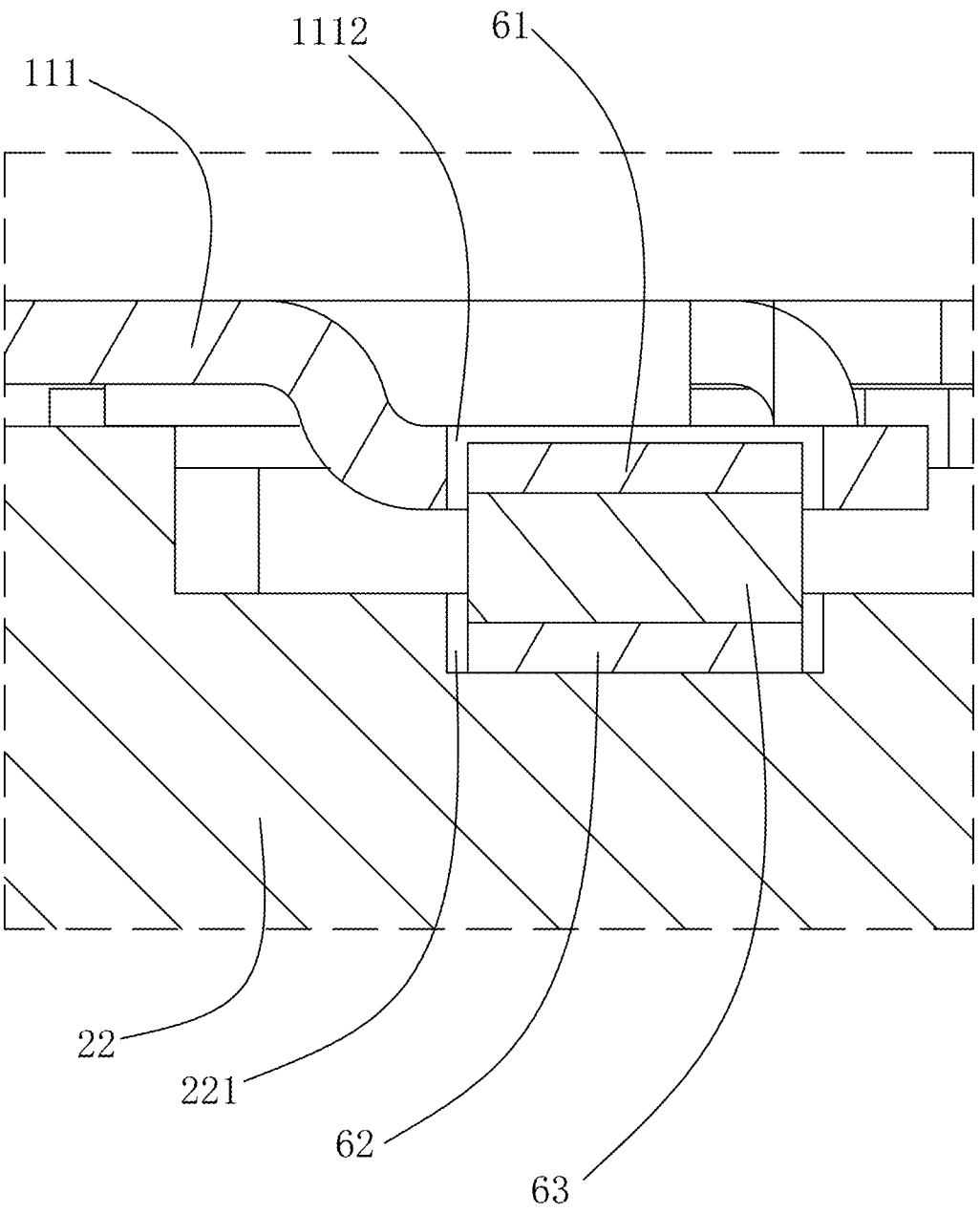
FIG. 4 is a partial cross-sectional view of the optical image stabilization module in FIG. 1.

Referring to FIGS. 1-4, the present disclosure discloses an optical image stabilization module 100 including a fixation holder 10, a movable holder 20, an elastic support 30 connecting the fixation holder 10 and the movable holder 20 and supporting the movable holder 20 to move relative to the fixation holder 10, an image sensor 40 fixed to the movable holder 20 and moving with the movable holder 20, a driving unit 50 driving the movable holder 20 to move in a plane in which the image sensor 40 is located, and a damping unit 60 connected between the fixation holder 10 and the movable holder 20.

The damping unit 60 includes a first clamping plate 61 fixed to the fixation holder 10, a second clamping plate 62 fixed to the movable holder 20, and a damping member 63 sandwiched between the first clamping plate 61 and the second clamping plate 62. A hardness of the first clamping plate 61 and a hardness of the second clamping plate 62 are both greater than a hardness of the damping member 63.

Optionally, the damping member 63 is made of one of silicon, rubber and thermoplastic elastomer. The first clamping plate 61 and the second clamping plate 62 are both made of stainless steel.

In this embodiment, the damping unit 60 has a cylinder shape. In other embodiments, the damping unit 60 can also have other three-dimensional shapes based on actual design requirements.

A thickness of the first clamping plate 61 and a thickness of the second clamping plate 62 are both less than a thickness of the damping member 63.

The fixation holder 10 includes a bottom cover 12 and a shell 11 engaged with the bottom cover 12. The bottom cover 12 and the shell 11 together form a containment space 101. The movable holder 20 and the image sensor 40 are arranged in the containment space 101.

The shell 11 includes a top wall 111 opposite to the bottom cover 12 and a side wall 112 connecting the top wall 111 and the bottom cover 12. The top wall 111 has a through hole 1111 exposing the image sensor 40.

The movable holder 20 includes a bottom plate 21 opposite to the bottom cover 12 and two supporting members 22 respectively arranged on two opposite sides of the bottom plate 21. The image sensor 40 is fixed to the bottom plate 21.

The elastic support 30 includes a first connecting part 31 fixed to the bottom plate 21 and surrounding the image sensor 40, two second connecting parts 32 extending from the first connecting part 31 and fixed to the two supporting members 22 in one-to-one correspondence, two third connecting parts 33 fixed to the bottom cover 12 and respectively arranged on another two opposite sides of the bottom plate 21, and four elastic arms 34 respectively connected between every adjacent second connecting part 32 and third connecting part 33, each elastic arm 34 extending along the side wall 112.

An amount of the damping units 60 is two, and the two damping units 60 are in one-to-one correspondence to the two supporting members 22. Each damping unit 60 is arranged between the corresponding supporting member 22 and the top wall 111. The first clamping plate 61 of each damping unit 60 is arranged in a corresponding containment hole 1112 formed in the top wall 111. The second clamping plate 62 of each damping unit 60 is arranged in a containment groove 221 formed in the corresponding supporting member 22.

The optical image stabilization module 100 further includes a sensor circuit board 70. The sensor circuit board 70 is fixed to the bottom plate 21 and surrounds the image sensor 40.

The driving unit 50 includes four electromagnetic assemblies 501 respectively arranged at four corners of the side wall 112. Each electromagnetic assembly 501 includes a first magnet 51 fixed to the top wall 111, a second magnet 52 fixed to the bottom cover 12 and facing the first magnet 51, and a coil assembly 53 arranged between the first magnet 51 and the second magnet 52.

The first magnet 51 includes a first portion 511 and a second portion 512 that are perpendicular to each other. The second magnet 52 includes a third portion 521 and a fourth portion 522 that are perpendicular to each other. The first portion 511 of the first magnet 51 faces the third portion 521 of the second magnet 52. The second portion 512 of the first magnet 51 faces the fourth portion 522 of the second magnet 52.

The coil assembly 53 includes a coil circuit board 531 fixed to the sensor circuit board 70 and a first coil 532 and a second coil 533 that are formed on the coil circuit board 531 and perpendicular to each other. The first coil 532 is arranged between the first portion 511 of the first magnet 51 and the third portion 521 of the second magnet 52. The second coil 533 is arranged between the second portion 512 of the first magnet 51 and the fourth portion 522 of the second magnet 52.

In the optical image stabilization module 100 according to the present disclosure, the damping unit 60 connected between the fixation holder 10 and the movable holder 20 includes the first clamping plate 61 fixed to the fixation holder 10, the second clamping plate 62 fixed to the movable holder 20, and the damping member 63 sandwiched between the first clamping plate 61 and the second clamping plate 62. The hardness of the first clamping plate 61 and the hardness of the second clamping plate 62 are both greater than the hardness of the damping member 63. Thus, the damping unit 60 has a stable and reliable design structure, thereby having good consistency and a better damping effect. Therefore, the optical image stabilization module 100 can improve the optical image stabilization performance.

In should be noted that the "fixed to" mentioned above includes a direct fixed way or an indirect fixed way with an intermediate medium.

The above are only embodiments of the present disclosure. It should be pointed out that those of ordinary skill in the art may also make improvements without departing from the ideas of the present disclosure, all of which fall within the protection scope of the present disclosure.

What is claimed is:

1. An optical image stabilization module, comprising:
a fixation holder;
a movable holder;
an elastic support, connecting the fixation holder and the movable holder and supporting the movable holder to move relative to the fixation holder;
an image sensor, fixed to the movable holder and moving with the movable holder;
a driving unit, driving the movable holder to move in a plane in which the image sensor is located; and
a damping unit, connected between the fixation holder and the movable holder, wherein
the damping unit comprises a first clamping plate fixed to the fixation holder, a second clamping plate fixed to the movable holder, and a damping member sandwiched between the first clamping plate and the second clamping plate; a hardness of the first clamping plate and a hardness of the second clamping plate are both greater than a hardness of the damping member.

2. The optical image stabilization module as described in claim 1, wherein the damping member is made of one of silicon, rubber and thermoplastic elastomer.

3. The optical image stabilization module as described in claim 1, wherein the first clamping plate and the second clamping plate are both made of stainless steel.

4. The optical image stabilization module as described in claim 1, wherein the damping unit has a cylinder shape.

5. The optical image stabilization module as described in claim 1, wherein a thickness of the first clamping plate and a thickness of the second clamping plate are both less than a thickness of the damping member.

6. The optical image stabilization module as described in claim 1, wherein the fixation holder comprises a bottom cover and a shell engaged with the bottom cover; the bottom cover and the shell together form a containment space; the movable holder and the image sensor are arranged in the containment space; the shell comprises a top wall opposite to the bottom cover and a side wall connecting the top wall and the bottom cover; the top wall has a through hole exposing the image sensor; the movable holder comprises a bottom plate opposite to the bottom cover and two supporting members respectively arranged on two opposite sides of the bottom plate; the image sensor is fixed to the bottom plate; the elastic support comprises a first connecting part fixed to the bottom plate and surrounding the image sensor, two second connecting parts extending from the first connecting part and fixed to the two supporting members in one-to-one correspondence, two third connecting parts fixed to the bottom cover and respectively arranged on another two opposite sides of the bottom plate, and four elastic arms respectively connected between every adjacent second connecting part and third connecting part, each elastic arm extending along the side wall.

7. The optical image stabilization module as described in claim 6, wherein an amount of the damping units is two, and the two damping units are in one-to-one correspondence to the two supporting members; each damping unit is arranged between the corresponding supporting member and the top wall; the first clamping plate of each damping unit is arranged in a corresponding containment hole formed in the top wall; the second clamping plate of each damping unit is arranged in a containment groove formed in the corresponding supporting member.

8. The optical image stabilization module as described in claim 6, further comprising a sensor circuit board, wherein the sensor circuit board is fixed to the bottom plate and surrounds the image sensor; the driving unit comprises four electromagnetic assemblies respectively arranged at four corners of the side wall; each electromagnetic assembly comprises a first magnet fixed to the top wall, a second magnet fixed to the bottom cover and facing the first magnet, and a coil assembly arranged between the first magnet and the second magnet; the first magnet comprises a first portion and a second portion that are perpendicular to each other; the second magnet comprises a third portion and a fourth portion that are perpendicular to each other; the first portion of the first magnet faces the third portion of the second magnet; the second portion of the first magnet faces the fourth portion of the second magnet; the coil assembly comprises a coil circuit board fixed to the sensor circuit board and a first coil and a second coil that are formed on the coil circuit board and perpendicular to each other; the first coil is arranged between the first portion of the first magnet and the third portion of the second magnet; the second coil is arranged between the second portion of the first magnet and the fourth portion of the second magnet.

* * * * *